J. MORCK.
CENTRIFUGAL SEPARATOR.
APPLICATION FILED AUG. 30, 1906.
929,537.
Patented July 27, 1909.
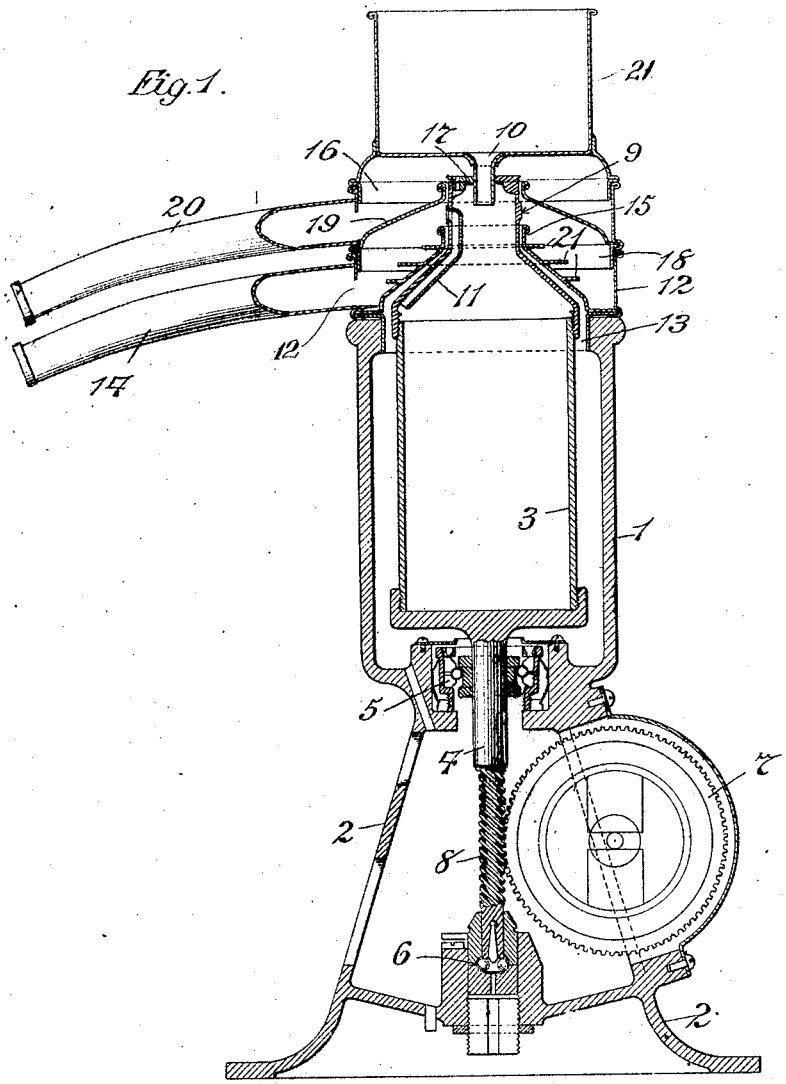
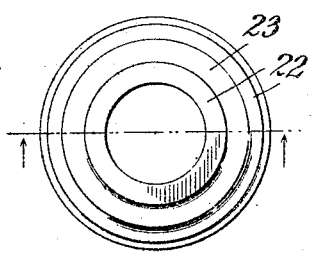
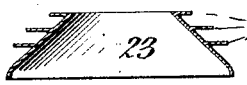

UNITED STATES PATENT OFFICE.

JOSVA MORCK, OF MASON CITY, IOWA.

CENTRIFUGAL SEPARATOR.

No. 929,537.    Specification of Letters Patent.    Patented July 27, 1909.

Application filed August 30, 1906. Serial No. 332,618.

*To all whom it may concern:*

Be it known that I, JOSVA MORCK, a citizen of the United States, and a resident of Mason City, county of Cerro Gordo, State of Iowa, have invented new and useful Improvements in Centrifugal Separators, of which the following is a specification.

The present invention relates to an improvement in centrifugal separators for milk and other liquids wherein the liquid is fed downward into the center of a rapidly revolving bowl or container and the separated constituents are discharged from different outlets at or near the top of the same. In separators of this class trouble frequently arises through the foaming of the blue milk, or other heavier constituent, as it leaves the revolving bowl, whereby this element of the separated substances is likely to become mixed with the cream or lighter element at the outlet.

It is one object of the present invention to supply means whereby this mixture shall be prevented.

Another object of the invention is the provision of means for catching the foam formed as stated above, under such circumstances that it shall condense, losing the entrained air, and falling back to be discharged with the remainder of the blue milk or other heavy element.

The present invention is illustrated in preferred form in the accompanying drawings, wherein—

Figure 1 is a vertical section of the general structure of a centrifugal separator containing my improvement, Fig. 2 is a top plan view of a removable multiple dam and Fig. 3 is a median vertical section of the device shown in Fig. 2.

The outer casing 1 is supported by the legs 2 and contains the revoluble bowl 3, the driving shaft 4 of which is supported by suitable bearings 5 and 6. The worm wheel 7, carried by the legs 2 driven in any suitable manner engages the worm 8 to drive the bowl 3. The top of the bowl is tapered down to a neck 9 at the top. The full milk, or other unseparated liquid is fed in at the center through the spout 10 and enters certain well known guiding means within the bowl 3 which are not shown in the drawing, as they form no part of the present invention. An exit tube or spout 11 is carried within the upper tapered part of the bowl 3, and through this the outgoing blue milk or other heavy element is forced into the lower discharge chamber 12 or passage. This chamber is preferably made of sheet metal, and is set on the top of the casing 1, having a flange 13 which snugly fits the top of said casing, and being also provided with the usual final exit spout 14. The bottom of the lower chamber 12 is raised so as to envelop the tapered upper portion of the bowl 3, and forming a neck 15 surrounding and guiding the lower part of the neck 9. It is just above this neck 15 that the tube 11 discharges. The upper discharge chamber 16 or passage receives the cream or other lighter element which leaves the bowl at the opening 17. The chamber 16 is also preferably made of sheet metal and stands upon the chamber 12, having a flange 18 which snugly fits the top of said lower chamber. The bottom 19 of the chamber 16, which forms the top of the lower chamber, is arched upward and surrounds the inner neck 9, serving as an additional guide for the revolving bowl. The spout 20 forms the outlet for the chamber 16. The whole is surmounted by the receiving bowl or hopper 21 into which the full milk is poured, passing through the spout 10 as aforesaid.

The construction thus far described is already well known and has been herein set forth merely to make clear the relation, location and advantages of my improvement.

As the full milk leaves the rapidly revolving spout 11, it strikes the arched partition 19 with a considerable impact, due to the centrifugal force. This forms a certain amount of foam and it has been found that, under certain circumstances, some of this foam finds its way up around the neck 9 and mixes with the cream in the upper chamber 16. In order to prevent this and to cause detention of the foam until the bubbles break, I have devised the following construction.

On the bottom of the lower chamber 12 at suitable intervals I provide a series of dams. While these may be of different forms and sizes, and may occupy a variety of relative locations, I prefer to use continuous parallel annular dams 22 one above the other as shown in Fig. 1. Under these dams the foam is caught as it tends to rise toward the top of the neck 9. The foam thus caught is detained by the dams until the bubbles break, allowing the liquid to leave by the spout 14.

In the form shown in Fig. 1, the dams are shown integral with the conical bottom of the lower chamber, and this construction is within the scope of my present invention, but I prefer to use a separable dam-cap such, for instance, as shown in Figs. 2 and 3. Here the cap 23 preferably of sheet metal is provided on its exterior surface with the dams, as 22, and the shape of the whole is such that it fits snugly over the bottom of the chamber 12, producing the same arrangement as shown in Fig. 1 and with the effect heretofore explained. The main advantage of the modification shown in Figs. 2 and 3 is found in the fact that the cap can be easily removed for cleaning and replaced when worn out. The construction of a separate cap of this kind is easier and cheaper than of the form shown in Fig. 1.

It is to be understood that, whether integral with the chamber or made on a separable cap, the dams may have a variety of forms and arrangements without departing from my invention.

What I claim is—

1. In a centrifugal separator comprising a revolving container provided with a discharge outlet for the light liquid and a lower discharge outlet for the heavy liquid, a passage connected with each of said outlets one above the other, and said passages separated by a partition, and a fixed dam extending in a transverse direction part way across the lower passage.

2. In a centrifugal separator comprising a revolving container provided with discharge outlets for the light and heavy liquid respectively, a passage connected with each of said outlets, said passages separated by a partition, and a fixed dam extending in a transverse direction part way across the passage for the heavier liquid.

3. In a centrifugal separator comprising a revolving container provided with discharge outlets in its upper portion for the light and heavy liquid respectively, a passage connected with each of said outlets, said passages separated by a partition, and a fixed dam extending in a transverse direction part way across the passage for the heavier liquid.

4. In a centrifugal separator comprising a revolving container provided with discharge outlets in the same portion of the container for the light and heavy liquid respectively, a passage connected with each of said outlets, and said passages separated by a partition, and a fixed dam extending in a transverse direction in the passage for the heavier liquids.

5. In a centrifugal separator comprising a revolving container provided with discharge outlets in the same portion of the container for the light and heavy liquid respectively, a passage connected with each of said outlets, and said passage separated by a partition, and a fixed dam extending in a transverse direction part way across the passage for the heavier liquid.

6. In a centrifugal separator comprising a revolving container provided with discharge outlets in the same portion of the container for the light and heavy liquid respectively, a passage connected with each of said outlets, and said passages separated by a partition, and a plurality of fixed dams extending in a transverse direction in the passage for the heavier liquid.

7. A centrifugal separator comprising a revolving container provided with discharge outlets in the same portion of the container for the light and heavy liquid respectively, a passage connected with each of said outlets, and said passages separated by a partition, and a fixed dam in the passage for the heavier liquid extending outward from the inner wall of said passage and part way across the path of the liquid.

8. A centrifugal separator comprising a revolving container provided with discharge outlets in the same portion of the container for the light and heavy liquid respectively, a passage connected with each of said outlets, and said passages separated by a partition, and a plurality of fixed dams in the passage for the heavier liquid extending outward from the inner wall of said passage.

9. A centrifugal separator comprising a revolving container provided with discharge outlets in the same portion of the container for the light and heavy liquid respectively, a passage connected with each of said outlets, and said passages separated by a partition, and plurality of fixed dams in the passage for the heavier liquid extending outward from the inner wall of said passage.

10. A centrifugal separator comprising a revolving container provided with discharge outlets in the same portion of the container for the light and heavy liquid respectively, a passage connected with each of said outlets, and said passages separated by a partition, and a plurality of fixed dams at different levels in the passage for the heavier liquid extending outward from the inner wall of said passage.

11. A centrifugal separator comprising a revolving container provided with a discharge outlet, a discharge passage connected with said outlet, having its wall nearest to the container fixed and outwardly inclined from said container, and a fixed dam extending outwardly from said wall and partway across the passage.

12. A centrifugal separator comprising a revolving container provided with a discharge outlet, a discharge passage connected with said outlet, having its wall nearest to the container, fixed and outwardly inclined from said container, and a plurality of fixed dams extending outwardly from said wall.

13. A centrifugal separator comprising a revolving container provided with a discharge outlet, a discharge passage connected with said outlet, having its wall nearest to the container fixed and outwardly inclined from said container, and a plurality of fixed dams at different levels extending outwardly from said wall.

14. A foam detaining device for centrifugal separators consisting of a tapering member provided with a plurality of ledges extending transversely therefrom and in substantially parallel planes to prevent foam rising on the outside of said cap when liquid is thrown upon it.

15. A foam detaining device for centrifugal separators consisting of a conical cap provided with a plurality of parallel annular ledges extending outwardly in substantially horizontal planes from the outer surface of said cap at different levels, for preventing the rising of foam on the outside of said cap when liquid is thrown upon it.

In testimony whereof, I have signed my name to this specification, in the presence of two subscribing witnesses.

JOSVA MORCK.

Witnesses:
E. W. CLARK,
L. OLIVER STONE.